April 18, 1933.   A. E. MAROLF   1,904,319
VARIABLE SPEED TRANSMISSION
Original Filed Aug. 11, 1928
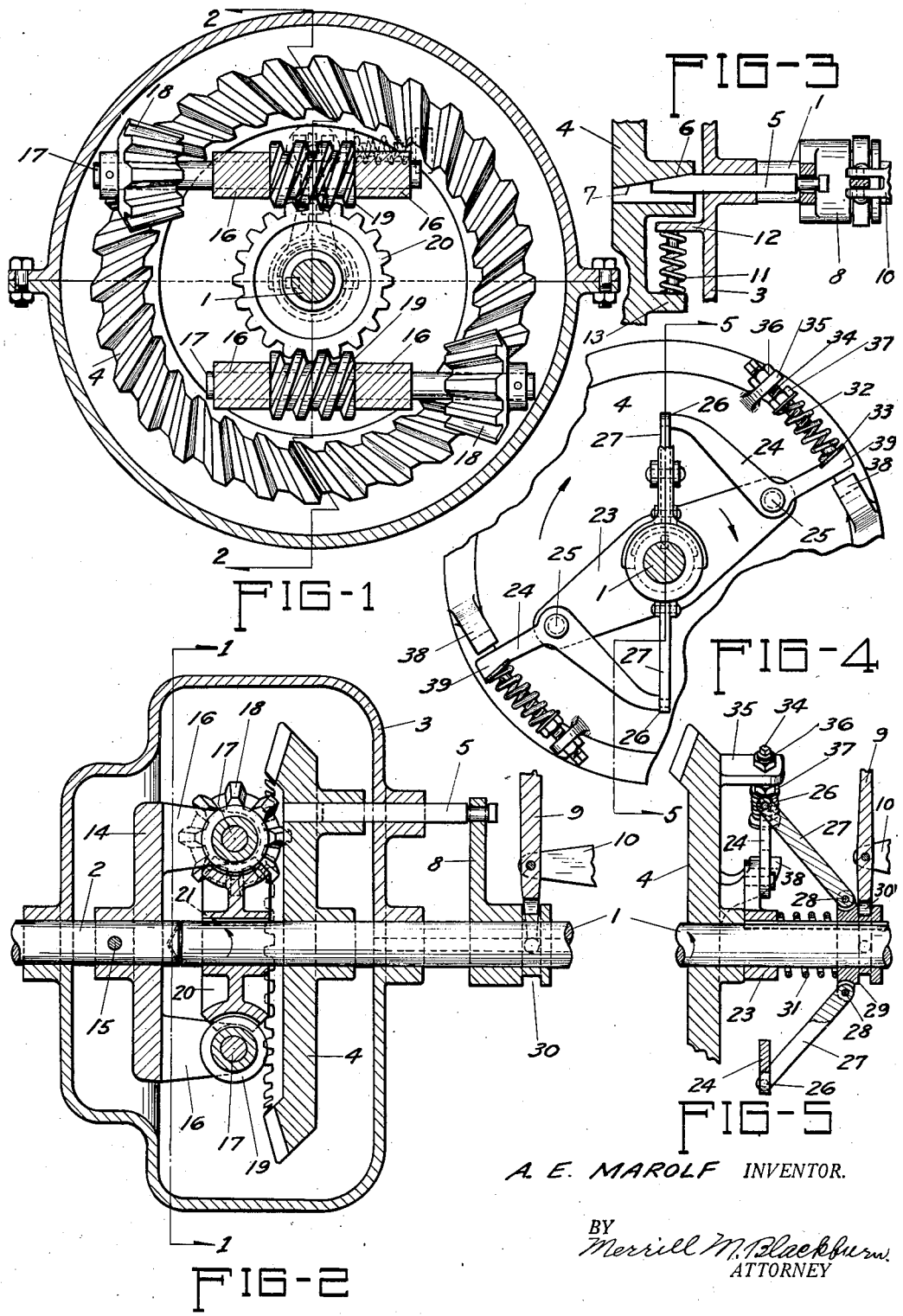
A. E. MAROLF INVENTOR.
BY Merrill M. Blackburn
ATTORNEY Patented Apr. 18, 1933

1,904,319

UNITED STATES PATENT OFFICE

ALBERT E. MAROLF, OF DAVENPORT, IOWA

VARIABLE SPEED TRANSMISSION

Application filed August 11, 1928, Serial No. 298,924. Renewed October 15, 1932.

This invention relates to means for transmitting force from a driving member to a driven member and is designed to serve as a variable speed transmission functioning without the customary sets of gearing which are commonly used. Stated differently, this invention relates to new and useful improvements in transmission devices in general and particularly to those where the rotational speed of one shaft or mechanical element is to be varied automatically and continuously with respect to the state of motion or rest of another shaft or element.

Among the objects of this invention are to provide a device which will, with the parts in one position of adjustment, transmit no force from the driving member to the driven member, in another position of adjustment, will transmit force directly from the driving member to the driven member, and in still other positions of adjustment, will transmit force in such a way as to produce different speeds in the driven member for a given speed of the driving member; to produce a device of the kind indicated which will automatically change from a higher driving relation to a lower driving relation with an increase in resistance to the driving force, due to an increase in load, an increase in road gradient, or other cause; to produce an automatic device for the purpose indicated; to provide a simple compact transmission unit affording positive engagement between rotatable shafts or mechanical elements in coaxial alignment; to provide method and means of varying continuously and infinitely the relative speeds of rotation of such elements with both manual and automatic control; to provide a device of this character permitting the unit to function practically in an inoperative condition thus allowing one of the elements to be in motion indefinitely while the other is at rest; to provide a unit of the class described comprising purely rotating elements, avoiding all crank motion, ratchets and axial angularity and thus accomplishing inherent balance and continuous torque at all speeds; to provide a unit of the above characteristics without depending in any way upon frictional or gripping contacts to hazard slippage, and yet offer a yieldably positive connection between the driving and driven elements; to provide such a transmission unit of simple practical construction which is continuously and infinitely variable, whose operation is inherently automatic and yet capable of instant manual control, resulting in a device which permits the prime mover to operate at its most effective speeds and torque regardless of variations in resisting torque; and such further objects, advantages and capabilities as will hereafter appear and as are inherent in the construction disclosed herein. In general it is the purpose of this invention to transmit power from a prime mover to a driven shaft in such a manner that an increase in resisting torque may accomplish an adjustment of speed and torque factors, to balance the power of driving and driven shafts respectively, that is, to allow an increase of speed of the driving shaft or a decrease of the driven shaft. Aside from the general purpose of an automatic variable speed transmission the invention is also applicable as a mechanical power valving device or relay, as a clutch, brake, flexible coupling, compensator, governor (torque, speed, power) or such other service. My invention further resides in the combination, construction and arrangement of parts illustrated in the accompanying drawing and, while I have disclosed therein what is now considered the preferred embodiment of my invention, together with a modification thereof, I desire the same to be understood as illustrative only and not to be construed in a limiting sense.

In the drawing attached hereto and forming a part hereof, Fig. 1 is a section substantially along the plane indicated by the line 1—1, Fig. 2; Fig. 2 is a section substantially along the plane indicated by the line 2—2, Fig. 1; Fig. 3 is a fragmentary section at a right angle to the plane of section of Fig. 2, taken through the wedge element; Fig. 4 is a fragmentary view of a modified form of means for controlling the functioning of the unit; Fig. 5 is a fragmentary section substantially along the plane indicated by the broken line 5—5, Fig. 4.

Referring more in detail to the annexed drawing, numeral 1 denotes the driving shaft and numeral 2 the driven shaft in connection with which this device is illustrated. A casing 3 is shown as surrrounding the ends of these two shafts and enclosing the main operative parts of this device. In this casing 3 is a skew bevel gear 4 which is loosely mounted on the shaft 1 and capable of a limited amount of rotary movement with relation to said shaft. A wedge element 5 has an inclined face 6 which cooperates with the inclined face 7 of the gear 4 to cause relative movement, in one direction, of the gear with relation to the casing 3 and shaft 1. This wedge is actuated by any suitable means 8 which is in turn actuated by means 9 and 10 as will be readily understood from the drawing. The link 10 is connected with any suitable operating means such as a lever. By actuating this, the wedge 5 may be caused to reciprocate in the opening through the gear 4, thus causing this gear to move with relation to the casing 3. A spring 11 abuts at one end against a lug 12 upon the casing 3 and at its other end against a lug 13 on the gear 4. It will thus be seen that, as the wedge 5 is withdrawn, the lugs 12 and 13 will be caused by the spring 11 to separate, thus causing a slight rotational movement of the gear with relation to the casing and causing a tension on the worms 19, thus opposing free rotational movement of the worm wheel 20. The purpose of this rotational movement will be explained more fully hereinafter.

A spider 14 is secured to the shaft 2 by any suitable means 15 such as a pin or key. This spider has a plurality of arms 16 having bearings therein for the shafts 17. On these shafts are secured pinions 18 and worms 19 which mesh respectively with the gear 4 and the worm wheel 20. The latter is secured to the shaft 1 by means of a key 21 or in any other suitable manner. It will therefore be seen that when the shaft 1 is driven by power from a suitable source of power the worm wheel 20 will be caused to rotate with the shaft 1 and its teeth will engage the threads of the worms 19 unless these are caused to rotate at a sufficient speed to keep away from the teeth of the wheel 20. A method of accomplishing this will be described hereinafter.

When wedge 5 is shoved inwardly, gear 4 will be slightly rotated in a forward direction with relation to the casing 3, as viewed in Fig. 1. In other words the gear 4 will be caused to assume a lead with respect to the driving shaft. This will cause a slight rotation of gears 18, shafts 17 and worms 19, thus transmitting a sufficient lead to the worms 19 with respect to worm wheel 20, to enable its threads to be out of contact with the teeth of the worm wheel 20, so that driving force applied to the shaft 1 will drive this shaft and worm wheel 20 freely. Since the ratio of gears 4 to gears 18 is the same as worm wheel 20 to worm 19 and since gear 4 is connected in leading driving relation with casing 3, rotation of shaft 1 will cause rotation of gears 18, shafts 17 and worms 19 so that the worms are always out of the way of wheel 20. Consequently, whatever the speed of shaft 1, wheel 20 cannot catch up to worm 19 and there will therefore be no rotation of shaft 2 caused by rotation of shaft 1. The unit is therefore in disengaged condition.

On the other hand, when wedge 5 is withdrawn, lug 13 is forced away from lug 12 by the expansion of spring 11. This causes gear 4 to be slightly rotated in a clockwise direction with relation to the casing 3, as viewed in Fig. 1, assuming a lag, under tension, with respect to the shaft 1. This motion will also be transmitted to gears 18, shafts 17 and worms 19 and will bring the threads of worms 19 into contact with the teeth of the worm wheel 20 causing positive engagement thereof and preventing relative movement between them, and resulting in the driving force supplied to shaft 1 being transmitted through wheel 20, worms 19, arms 16 of the spider 14, and to the shaft 2. The unit in this position of adjustment is therefore in direct driving engagement.

Variations in velocity ratio between the limits of disengagement and direct driving, just described, are accomplished directly and automatically by the resisting torque of the load. As the load resisting the driving force increases, the tooth pressure between the worms 19 and the worm wheel 20 also increases, with a tendency on the part of wheel 20 to drive the worms 19. Such tendency, however, is resisted by the tension applied against the turning of the worms 19, by the spring 11 through the gear 4, pinion 18 and shaft 17. Whenever the resistance due to the load is sufficient to compel wheel 20 to drive its worms 19 in spite of the tension opposing it, then the worms 19 will rotate on their own axes. This will result in a compensating action of the unit as a whole in which the rotational speed of wheel 20 is that of the driving force, the rotational speed of the worm is the other component and depends on the tooth pressure exerted by the load, and the resultant is the consequent reduced speed of the spider 14 carrying the worms 19. In other words, when the worms 19 do not turn on their own axes they and the spider 14 are carried around with wheel 20, giving a direct driving connection between shaft 1 and shaft 2. And when the worms 19 do turn on their own axes and with relation to wheel 20 then the spider 14 is compelled to turn at a slower speed and we have velocity ratio between shaft 1 and shaft 2. It is evident then that the reduction in speed of the driven shaft 2 is dependent upon the rotational movement of the worms 19 on their axes. A relatively slow constant speed of the worms 19 will cause a slight reduction in speed of shaft 2 with relation to shaft 1. A relatively high constant speed of the worms 19 will cause a great reduction in speed of shaft 2 with a consequent increase in torque. The rotation of the worms on their own axes and their relative speed is the resultant of two opposing forces, one of which is the constant tension applied by means of spring 11 to resist their rotational movement and the other is the turning effort caused by the tooth pressure between worms 19 and worm wheel 20. This tooth pressure is directly proportional to the resisting torque of the load so that any increase in load, beyond the value determined by the tension of the spring 11, will cause an unbalanced condition of the opposing rotational forces acting on the worms 19 with the result that the worms will assume a rotational speed in proportion to such unbalanced forces. In this manner, with a constant driving effort acting on the driving shaft 1, any variations in the resisting torque of the load will automatically accomplish a suitable adjustment of the unit to balance the power factors of the driving and driven shafts. Stated differently—any increase or variations in resisting torque greater than the value of the driving torque will automatically result in a suitable reduction or variation in speed of the driven shaft, allowing the prime mover to operate at a constant efficient speed regardless of variations in the load.

While the construction of Figs. 1, 2 and 3 has been first described because of its simplicity, this is not considered the preferred construction although it answers all the requirements of an automatic transmission of the class described. An additional feature of my invention is a means of manual control so that the operator can at all times and at any stage take immediate control of the functions of the device. It will enable him to use the device as a power valve or clutch permitting minute degrees and variations of engagement, with the added advantage of torque multiplication. It will also allow of the automatic action being retarded or accelerated as well as being prevented altogether. The construction of this feature is shown in Figs. 4 and 5 where Fig. 4 is a fragmentary view and Fig. 5 is a fragmentary section substantially along the plane indicated by the broken line 5—5, Fig. 4. In this construction the spider 23 is keyed to the shaft 1 and has the bell cranks 24 pivoted thereon at 25. These bell cranks are pivotally connected at 26 with the links 27 which have their opposite ends pivoted as shown at 28, to the slidable collar 29. This collar is provided with a groove 30 as in the construction shown in Figs. 2 and 3. Elements 9 and 10 are the same in this construction as in the previously described construction. However, it should perhaps be stated that instead of 10 being a link and 9 a lever pivoted at its upper end, 10 may be a bracket mounted on any fixed part of the machine and 9 be pivoted to this bracket, having its upper end free for operation by hand.

Between the collar 29 and the spider 23 is a coil spring 31 which normally tends to force the collar away from the spider. The tendency of this spring 31 is therefore to draw the pivots 26 toward the shaft 1, thus putting a pressure on springs 32 which tends to cause compression thereof, one end of the spring 32 being seated against an end of the bell-crank 24, as shown at 33. The opposite end of the spring 32 surrounds a screw 34 which is adjustably mounted in a lug 35 on gear 4 and is locked in place by means of a lock-nut 36. The tension of spring 32 can be adjusted by means of the nut 37 against which the second end of the spring exerts pressure. Other lugs 38 are formed upon or secured to the gear 4 and may be engaged by the free ends of the bell-cranks 24 as will be evident from Fig. 4 of the drawing. When collar 29 is forced towards spider 23 by actuation of element 9, links 27 cause the ends of bell cranks 24 connected thereto to be moved away from the shaft 1, thereby causing the free ends of these bell cranks to be moved towards the lugs 38. When ends 39 engage the lugs, pressure is exerted thereon to cause slight rotation of the gear 4 in a clockwise direction. This causes rotational displacement of gears 18, shafts 17 and worms 19 in a direction tending to get the threads of the worms out of engagement with the teeth of the wheel 20, thus reducing the contact face pressure between the threads and the teeth and permitting free relative movement between worms 19 and wheel 20 so that any driving force applied by the shaft 1 cannot be transmitted through the spider 14 to shaft 2. This disengaged condition of the unit is therefore accomplished by the compression of the coil spring 31 by forcing in of collar 29 as described. When it is desired to bring the unit into a condition of engagement the reverse of this action takes place, that is—the collar 29 is allowed to be forced out by the expansion of the coil spring 31 which, acting on the bell cranks 24, exerts pressure against springs 32 and therefore applies a slight rotational movement to gear 4 in a counter clockwise direction. This displacement, under tension, is transmitted through gears 18, shafts 17 and worms 19 tending to resist rotation of worms 19 and therefore compelling spider 14 to follow the turning effort of worm wheel 20. In this manner shaft 2 is brought into rotational movement and its acceleration is proportional to the expansive pressure allowed to be exerted by coil spring 31. Full expansion of spring 31 permits the unit to function automatically either as direct driving or at variable speeds if the resisting torque is greater than the driving torque.

Furthermore should the operator desire to prevent this automatic variation of speed-ratio at any instant he can do so by exerting an outward pressure on collar 29 through control lever 9 as in Figs. 4 and 5. This action, through links 27 and bell-cranks 24, compels the end face 33 to come in contact with the end of adjustable screw 34, causing a positive retrograde pressure on gear 4 and thus enabling the operator to lock the worms 19 against any turning tendency exerted by the resisting torque through tooth pressure between worms 19 and worm wheel 20. In this manner shaft 2 will be held in direct and positive engagement with shaft 1 except as it is allowed to retard by relaxation of pressure on lever 9 by the operator.

If the nut 37 is adjusted around the screw 34 toward the arm 39, the load torque necessary to start slippage between the worm 19 and worm wheel 20 is increased and, conversely, when the nut 37 is backed away from the arm 39, the amount of load torque required to start this slippage is lowered. If the screw 34 is adjusted inwardly towards the arm 39, the point at which the arm 39 engages the end of screw 34 to positively turn the gear 4 upon the shaft 1 is reached sooner during the operation of the lever 9. Expressed differently, when the lever 9 is actuated to move the sleeve 29 away from the spider 23 the links 27 are brought more nearly into parallelism with the shaft 1, thereby turning the bell-cranks about their pivots 25. This operation compresses the springs 32 which biases the gear 4 in a counter-clockwise direction as shown in Fig. 4 or a clockwise direction as shown in Fig. 1, these two views being at opposite sides of the gear 4. Compression of this spring results in a resilient bias of the gear. However, when the lug on the end of arm 39 strikes the end of screw 34 a positive bias is placed upon this gear causing rotation of gear 18, shaft 17 and worm 19 in a direction tending to overcome any tendency towards slippage between worm 19 and wheel 20. It will be evident from the foregoing that the more the slippage between the wheel 20 and the worms 19 the less will be the rotational speed of the spider 14 about its axis and the higher will be the driving ratio between the driving shaft 2 and the driven shaft 1.

While I have disclosed two embodiments of my invention, there are other forms in which the same may be carried out and it is therefore of course understood that the specific description of structure set forth above may be departed from without departing from the spirit of my invention as set forth in this specification and the appended claims.

Having now described my invention, I claim:

1. In a structure of the character described, a pair of aligned shafts, one carrying a worm wheel and the other a carrier for a worm, a worm carried by the carrier and capable of rotational displacement about its axis, a pinion mounted about the axis of the worm for unitary movement therewith, the worm and worm wheel being connected in driving relation such that rotation of the shaft carrying the worm wheel may cause rotation of the carrier and the shaft to which the carrier is connected, a gear on the first shaft meshing with said pinion and capable of oscillatory motion with relation to the shaft, and means for controlling the functioning of the last mentioned gear.

2. In a structure of the character described, a pair of aligned shafts, one carrying a worm wheel and the other a carrier for a worm, a worm carried by the carrier and capable of rotational displacement about its axis, a pinion mounted about the axis of the worm for unitary movement therewith, the worm and worm wheel being connected in driving relation such that rotation of the shaft carrying the worm wheel may cause rotation of the carrier and the shaft to which the carrier is connected, a gear on the first shaft meshing with said pinion and capable of oscillatory motion with relation to the shaft, and means for imparting slight rotational movement to the second named gear.

3. In a structure of the character described, a pair of aligned shafts, one carrying a worm wheel and the other a carrier for a worm, a worm carried by the carrier and capable of rotational displacement about its axis, a pinion mounted about the axis of the worm for unitary movement therewith, the worm and worm wheel being connected in driving relation such that rotation of the shaft carrying the worm wheel may cause rotation of the carrier and the shaft to which the carrier is connected, a gear on the first shaft meshing with said pinion and capable of oscillatory motion with relation to the shaft, means for imparting slight rotational movement to the second named gear and other means for imparting a similar opposite movement thereto.

4. In a structure of the character described, a pair of aligned shafts, one carrying a worm wheel and the other a carrier for a worm, a worm carried by the carrier and capable of rotational displacement about its axis, a pinion mounted about the axis of the worm for unitary movement therewith, the worm and worm wheel being connected in driving relation such that rotation of the shaft carrying the worm wheel may cause rotation of the carrier and the shaft to which the carrier is connected, a gear on the first shaft meshing with said pinion and capable of oscillatory motion with relation to the shaft, and means for controlling the functioning of the last mentioned gear, the gear ratio of the pinion and its gear being substantially identical with that of the worm and worm gear.

5. In a structure of the character described, a casing, a pair of shafts extending into said casing from opposite directions, one of said shafts having a worm wheel fixed thereto adjacent its extremity within the casing and the other having a spider secured adjacent its extremity and extending into proximity to the worm wheel, a shaft carried by the spider and having a worm mounted thereon, said worm meshing with the worm wheel, and means operating in conjunction with one of said pair of shafts for reducing or increasing the tooth contact face pressure between the worm wheel and worm.

6. In a speed change mechanism of the character described, an interrupted shaft, a casing surrounding the adjacent ends of the shaft, said casing being connected to one of the shaft sections for rotation therewith, a gear loosely mounted on said shaft section within the casing, a worm wheel rigidly mounted on the end of said shaft section for rotation therewith, carrier means mounted rigidly on the adjacent end of the second shaft section, a worm carried by the carrier means and rotatable therein, said worm engaging the worm wheel so as to transmit driving torque from one shaft section to the other, and means operating in conjunction with the driving shaft and the worm to vary the contact face pressure between the worm wheel and worm and raise or lower the amount of driving torque from the driving shaft section required to cause rotation of the worm about its axis.

7. In an automatic speed change mechanism, an interrupted shaft, a worm carrier rigidly secured adjacent the end of one section of said shafts, worms carried by the worm carrier, a worm wheel rigidly mounted on the end portion of the second section of the shaft, said worms having engagement with the worm wheel so that driving torque applied to the second section of the shaft may cause rotation of the first section, means normally maintaining a contact face pressure between the worms and worm wheel, said means being capable of yielding with increases in resisting torque of the driven section of the shaft.

8. In an automatic speed change mechanism, an interrupted shaft having its sections in substantial alignment, a worm carrier rigidly secured adjacent the end of one section of said shaft and having parts projecting into positions partly surrounding the end of the other section, worms carried by the projecting parts, a worm wheel rigidly mounted on the end portion of the second section of the shaft, said worms having engagement with the worm wheel so that driving torque applied to the second section of the shaft may cause rotation of the first section, means normally maintaining a contact face pressure between the worms and worm wheel, said means being capable of yielding with increases in resisting torque of the driven section of the shaft.

9. An automatic variable speed transmission comprising a pair of substantially aligned shafts, gear connections between the shafts normally holding them relatively immovable, said connections including elements resisting relative movement between them under normal driving torque, means applying continuous rotative tension to the resisting elements to prevent relative movement up to maximum driving torque.

10. An automatic variable speed transmission comprising a pair of substantially aligned shafts, gear connections between the shafts normally holding them relatively immovable, said connections including elements resisting relative movement between them under normal driving torque, means applying continuous rotative tension to the resisting elements to prevent relative movement up to maximum driving torque, in combination with controlling means to alter the value and direction of the applied tension.

11. A force transmitting connection for a pair of aligned shafts, comprising a wormwheel secured to one of the shafts, a spider secured to the other shaft, a worm carried by said spider and meshing with said wormwheel, the worm and worm-gear normally locking said shafts against relative rotation, gear connections between the worm-wheel shaft and the worm, in combination with means to cause relative movement between said worm and worm-wheel and thereby permit relative rotation between said shafts at different relative speeds.

12. In a structure of the character described, a driving element and a driven element, means connecting said elements in force transmitting relation, said means including a more or less self-locking worm and worm-wheel, other means, connected to and acting between the worm wheel and worm, applying continuous rotative tension to said worm in opposition to its rotative tendency under load to prevent relative movement between said worm and worm-wheel.

13. In a structure of the character described, a driving element and a driven element, means connecting said elements in force transmitting relation, said means including a more or less self-locking worm and worm-wheel, other means, connected to and acting between the worm wheel and worm, applying continuous rotative tension to said worm in opposition to its rotative tendency under load and tending to prevent relative movement between said worm and worm-wheel and therefore between said driving and driven elements, and controlling means to vary said continuously applied tension.

14. In a structure of the character described, a driving element and a driven element, means connecting said elements in force transmitting relation, said means including a more or less self-locking worm and worm-wheel, other means, connected to and acting between the worm wheel and worm, applying continuous rotative tension to said worm in opposition to its rotative tendency under load to prevent relative movement between said worm and worm-wheel and therefore between said driving and driven elements, and controlling means to vary said continuously applied tension, in combination with means to release said tension and apply pressure in the opposite direction.

15. In a structure of the character described, a driving element and a driven element, means connecting said elements in force transmitting relation, said means including elements of self-locking characteristics substantially locking against relative driving action between them in normal operation, other means, connected to and acting between such self-locking elements, applying continuous rotative tension to one of said self-locking elements and, in conjunction with its rotative tendency under load, causing relative movement between them and thereby relative speeds between driving and driven elements.

16. In a structure of the character described, a driving element and a driven element, means connecting said elements in force transmitting relation, said means including a self-locking worm and worm-wheel substantially locking said elements against relative movement in normal operation, other means, connected to and acting between the worm wheel and worm, applying continuous rotative tension to said worm and, in conjunction with its rotative tendency under load, causing relative movement between worm and worm-wheel and thereby relative speeds between driving and driven elements, and controlling means to vary said continuously applied tension.

17. In a structure of the character described, a driving element and a driven element, means connecting said elements in force transmitting relation, said means including a self-locking worm and worm-wheel substantially locking said elements against relative movement in normal operation, other means, connected to and acting between the worm wheel and worm, applying continuous rotative tension to said worm and, in conjunction with its rotative tendency under load, causing relative movement between the worm and worm-wheel and thereby relative speeds between driving and driven elements, and controlling means for varying said continuously applied tension to cause relative speeds between said elements from zero to maximum.

18. In a structure of the character described, a pair of mechanical elements one of which normally opposes the tendency of the other to move, operative means between said elements normally connecting them in force transmitting relation, means exerting continuous rotative tension to one element of the operative means to resist relative movement under normal torque of the elements of the said operative means, and other means for altering the value of such rotative tension and to apply pressure in the opposite direction.

19. An automatic variable transmission comprising a pair of substantially aligned shafts, self-locking worm-gear connections between the shafts normally holding them relatively immovable, corresponding intermeshing gears of a ratio equal to the worm-gear ratio, and of free relative movement, mounted on respective corresponding axes whereby the worm may be rotated, means for causing slight rotational displacement of one of said corresponding gears to relieve said worm-gear connections of torque load and transfer the drive through the corresponding gear train to cause maximum relative movement between said worm-gear connections and thereby accomplish an inoperative condition of the transmission unit.

In witness whereof, I hereunto subscribe my name to this specification.

ALBERT E. MAROLF.